Nov. 11, 1969  J. L. RAULSTON ET AL  3,477,420
HIGH CLOSET RANGE HOOD

Filed March 5, 1968                                    2 Sheets-Sheet 1

INVENTOR
JAMES L. RAULSTON and
STEPHEN L. ROGERS, JR.

BY
ATTORNEY

Nov. 11, 1969  J. L. RAULSTON ET AL  3,477,420
HIGH CLOSET RANGE HOOD
Filed March 5, 1968  2 Sheets-Sheet 2
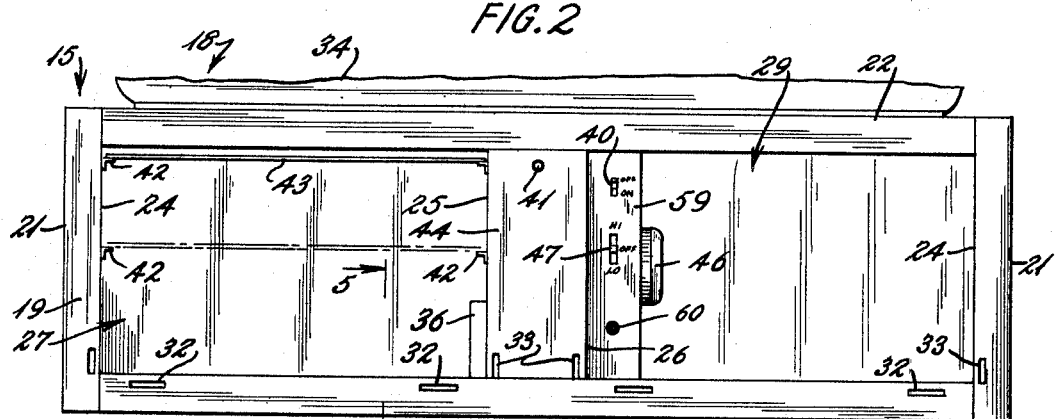
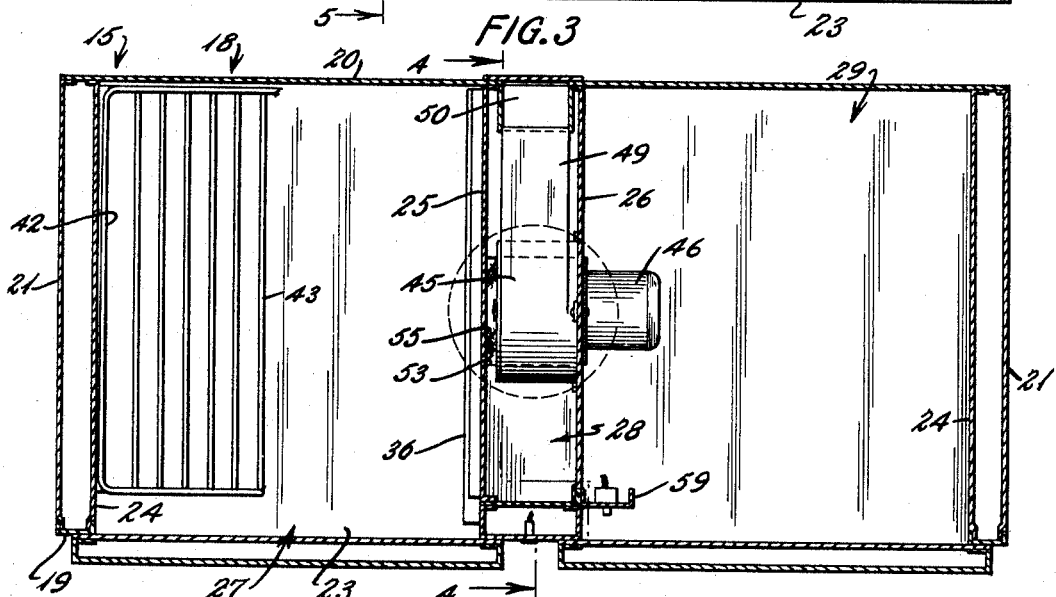
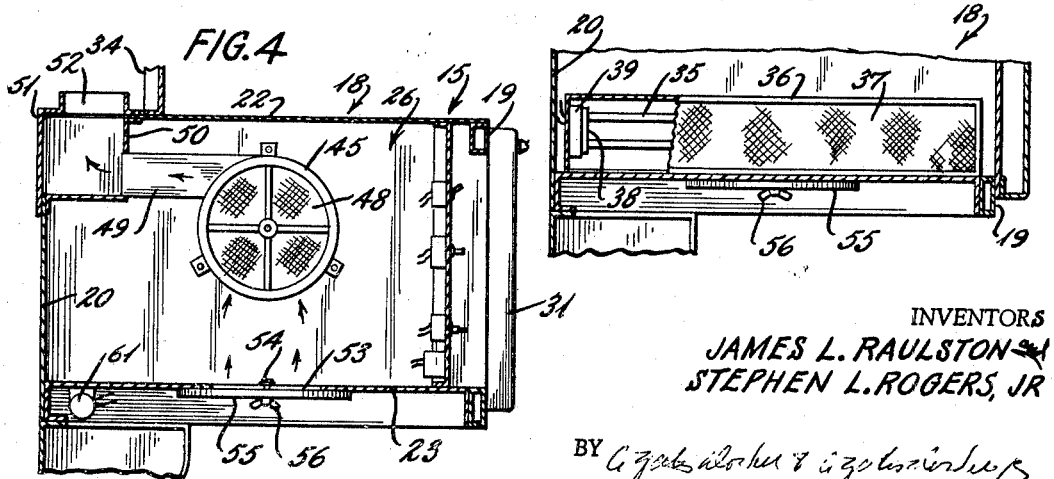
INVENTORS
JAMES L. RAULSTON
STEPHEN L. ROGERS, JR
BY
ATTORNEYS

United States Patent Office 3,477,420
Patented Nov. 11, 1969

3,477,420
HIGH CLOSET RANGE HOOD
James Leonard Raulston, 800 Holly Ave., and Stephen L. Rogers, Jr., 400 Magnolia Ave., both of South Pittsburgh, Tenn. 37380
Filed Mar. 5, 1968, Ser. No. 710,469
Int. Cl. F24c *15/20;* F23j *11/00*
U.S. Cl. 126—299                                                5 Claims

ABSTRACT OF THE DISCLOSURE

Apparatus located above a stove including a housing divided into multiple compartments with at least certain of the compartments having heating means for keeping food at a warm, palatable temperature.

BACKGROUND OF THE INVENTION

Field of the invention

This invention relates generally to stoves and other apparatus used in the preparation of food and relates particularly to apparatus mounted above a stove and adapted to treat smoke-laden air, as well as to provide a compartment for maintaining prepared food at a predetermined temperature.

Description of the prior art

Heretofore kitchen ranges and other stoves have been provided for many, many years and some of these stoves have had apparatus disposed above the burners for maintaining prepared food in a warm, palatable condition, while other devices have been provided for drawing smoke and air laden with cooking fumes upwardly through a filter device which treated the air and removed impurities therefrom. Several styles of old fashioned coal and wood burning stoves were provided with compartments above the same which were used as warming ovens and obtained their heat from the fire box which continued to discharge heat after the cooking had been completed. With the advent of gas and electric stoves, the trend initially was to eliminate any overhead compartments and subsequently vented hoods were introduced which were designed to draw smoke and odor-laden air through a filter to remove the impurities therefrom. In the gas and electric stoves, ovens usually were provided which could be controlled thermostatically to maintain a low heat sufficient to keep prepared food warm. However, ovens thus in use were unable simultaneously to perform the functions for which they were intended. This problem is sufficiently widespread that in many modern homes two separate ovens are provided which usually are entirely separate from the range itself and instead are recessed in walls.

SUMMARY OF THE INVENTION

The present invention is a high closet range hood which preferably has the esthetic qualities of an old fashioned stove with the modern conveniences of either electric or gas burners. The high closet includes a housing divided into multiple compartments with at least one compartment provided with a heating unit to maintain the compartment at a predetermined temperature sufficient to keep prepared foods in a palatable condition for as long as required without further cooking of the food. Another compartment is provided with blower means for drawing smoke and odor-laden air through a filter and discharging the clean air to the exterior of the building or back into the room. Preferably another compartment is provided for the storage of certain foods, such as bread or the like, and thereby take advantage of normally unused space above the stove.

It is an object of the invention to provide a high closet range hood divided into multiple compartments, at least one of which is provided with an auxiliary source of heat and another of which is provided with a forced air fan for treating smoke and odor-laden air.

BRIEF DESCRIPTION OF THE DRAWINGS

FIG. 2 is a front elevation of the high closet with the doors removed.

FIG. 3 is an enlarged vertical section on the line 3—3 of FIG. 1.

FIG. 4 is a section on the line 4—4 of FIG. 3.

FIG. 5 is a section on the line 5—5 of FIG. 2.

DESCRIPTION OF THE PREFERRED EMBODIMENT

Figure 1:
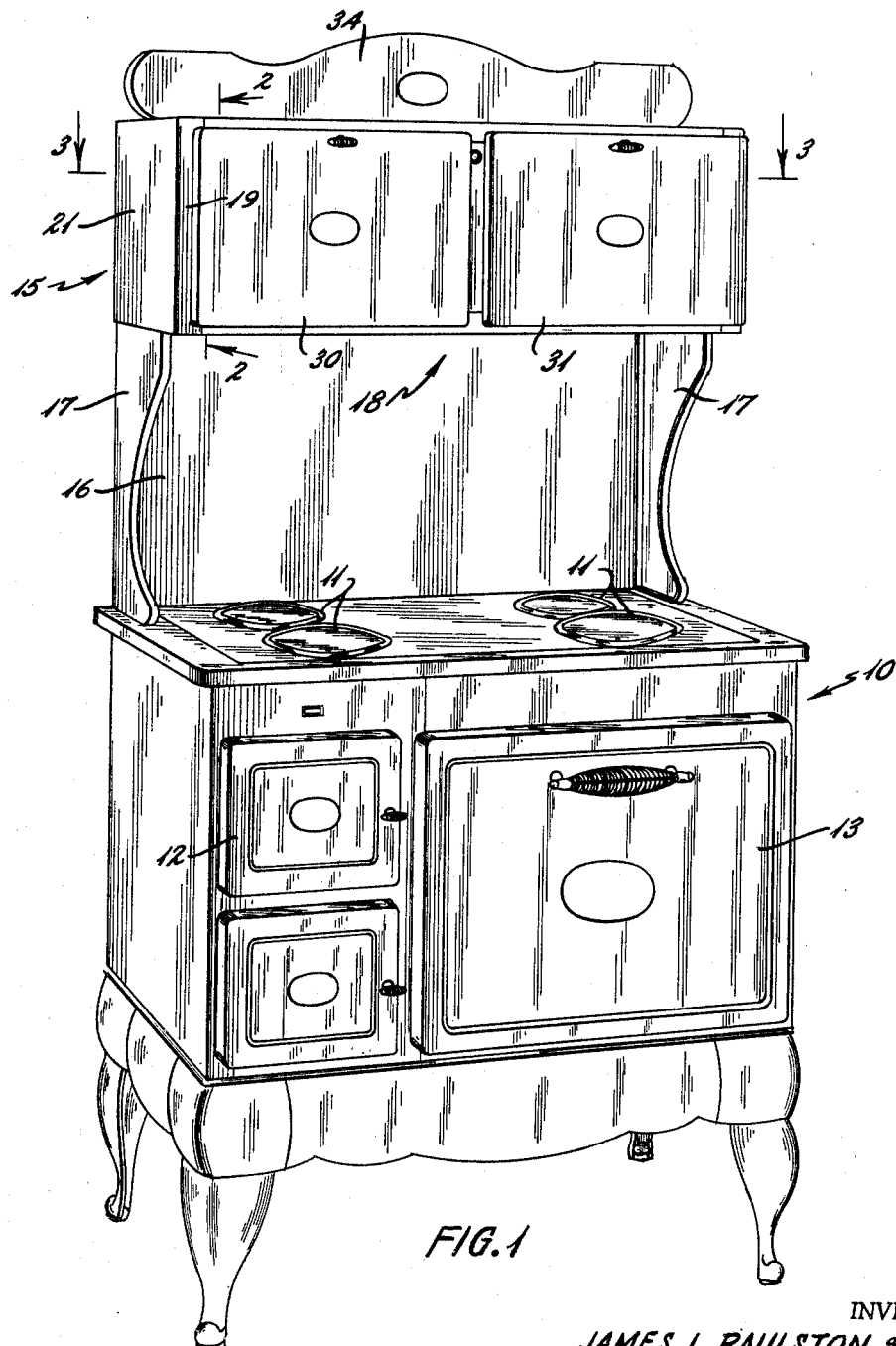
FIG. 1 is a perspective of an old fashioned type stove illustrating one application of the invention.

With continued reference to the drawings, a kitchen stove or range 10 is provided having the physical appearance of an old fashioned coal or wood burning range with gas or electric heating elements 11. The controls for the heating elements may be mounted in any convenient location. However, in the present device a control panel having knobs and switches for controlling the independent heating elements is located behind a door 12 in the front of the stove 10 which represents the door to the fire box of an old fashioned cast iron stove. An oven door 13 is provided at the front of the stove to afford access either to an oven or to a storage area for cooking utensils. The structure thus far described is conventional and forms no part of the inventive concept.

A high closet 15 is provided which is adapted to be mounted on the stove 10 in a position to overlie the upper surface of the stove to form a hood. The high closet includes a back splasher plate 16 connected to the rear of the stove 10 and a pair of supporting brackets 17 mounted on the top of the stove and adapted to support a housing 18. Such housing is generally rectangular in cross-section and includes front and rear walls 19 and 20, side walls 21, and top and bottom walls 22 and 23. Panels 24 are mounted within the housing in spaced generally parallel relation to the side walls 21 and if desired, these panels may be removable for cleaning. A pair of partitions 25 and 26 extend from the front wall 19 to the back wall 20 and from the top 22 to the bottom 23 of the housing to separate the housing into multiple compartments 26, 27 and 28, respectively. As illustrated in FIG. 3, the end compartments 27 and 29 are relatively wide, while the center compartment 28 is relatively narrow. The compartments 27 and 29 are open at the front wall 19 of the housing and are adapted to be closed by doors 30 and 31, respectively. Such doors may be mounted in any desired manner, such as hinges or the like, located either at the bottom or at one side thereof. As an example, each of the doors may be provided with a pair of arcuate brackets (not shown) received within slots 32 in the front wall 19 and such doors may have one or more segmental stop brackets slidably carried within generally vertical slots 33. If desired a decorative facade 34 may be mounted on the top of the housing 18 to enhance the appearance of the stove.

As illustrated, the left-hand compartment 27 functions as a warming oven to retain and store food after it has been prepared and cooked to keep the food in palatable condition. In order to provide heat for the compartment 27 a low heat Calrod unit 35 is mounted within an auxiliary housing 36 disposed within the compartment 27. Preferably the auxiliary housing 36 is open along one side and such openings may have a grill 37 or open mesh disposed across the same to permit the heat to pass from the Calrod unit 35 into the compartment freely while preventing direct contact with the Calrod unit. The Calrod unit 35 preferably has a plug-in type base 38 received within a receptacle 39 carried by the auxiliary housing 36 and such Calrod unit is supplied with electrical energy from a suitable source controlled by a switch 40 with an indicator light 41 disposed in the line and located between the doors 30 and 31 to indicate that the Calrod unit is on. If desired the Calrod unit may be thermostatically controlled to vary the temperature within the compartment 27 or such Calrod unit can be preset to maintain a constant temperature. If desired the compartment 27 may have one or more sets of opposed brackets 42 extending inwardly from the side walls, and such brackets support a removable shelf 43.

As illustrated in FIGS. 3 and 4, the central compartment 28 is closed by a front plate 44 to prevent ready access thereto. Within this compartment a fan 45 driven by a two-speed motor 46 and controlled by a switch 47 is carried by the partition 26 and such fan is provided with a screened inlet 48 and an outlet duct 49. The outlet duct terminates in a discharge chamber 50 open at the top and rear. An L-shaped vent collar 51 is provided having an opening 52 in one leg with the opposite leg being imperforate. The vent collar 51 is reversibly mounted on the housing 18 so that the opening 52 can be disposed at the top to discharge air back into the room or the opening 52 may be located on the rear wall 20 and connected to a duct (not shown) for discharging air to the exterior of the building. The compartment 28 has an opening 53 in the bottom wall 23 with a brace 54 spanning such opening and providing a support bracket for a filter 55 connected thereto by a bolt and wing nut 56.

The compartment 29 serves as a storage area for bread, crackers, cookies and other foodstuffs to take advantage of the space above the stove as additional storage area. Also the motor 46 projects into the compartment 29. At the forward portion of the compartment, a control panel 59 is mounted on the partition 26 and such control panel is adapted to receive the switches 40 and 47, as well as a push button type switch 60 which controls a light 61 located below the housing 18 and adapted to illuminate the upper portion of the stove 10. The control panel 59 normally is covered by the door 31 to retain the esthetic value of the stove by hiding the various controls.

In the operation of the device it is often necessary that certain foods be prepared before other foods due mainly to a lack of space or insufficient heating elements. When this situation occurs the door 31 is opened and the upper switch 42 is moved to the "On" position so that electric energy will flow to the Calrod unit 35 and heat the compartment 27. After the compartment has been preheated the food to be kept in a warm condition is then inserted therein where it will remain palatable until the remainder of the meal has been prepared. In some instances the compartment 21 can serve as a warmer oven to warm rolls, buns or other foods which have been previously prepared and which require no cooking.

When smoke or odor-laden air begins to rise from the top of the cooking surface, the door 31 may be opened and the switch 47 is moved to either "High" or "Low" position to selectively energize the motor 46 and either discharge the smoke to the exterior of the building or remove the impurities and discharge the clean air back into the room.

It will be obvious to one skilled in the art that various changes may be made in the described embodiment of the invention without departing from the spirit and scope thereof and therefore the invention is not limited by that which is illusrated in the drawings and described in the specification, but only as indicated in the accompanying claims.

What is claimed is:

1. In a high closet for a kitchen stove, the combination of a food warming compartment, an exhaust compartment and a storage compartment comprising a housing, partitions within said housing dividing the interior into at least three compartments, the first and third compartments having openings normally closed by doors, heating means located within said first compartment in a position to heat the air therein, a second compartment located between said first and third compartments, exhaust fan means within said second compartment, said second compartment having an opening providing communication with the exterior of said housing, filter means normally covering said opening, air duct means connecting said exhaust fan means with a discharge chamber, a vent collar selectively controlling the discharge of air from said chamber, said third compartment providing a storage area, means in said third compartment for driving said fan means in said second compartment, a control panel in said third compartment, and means on said control panel for selectively controlling the operating of said heating means and said means for driving said fan means.

2. In a high closet for a kitchen stove, the combination of a food warming compartment, an exhaust compartment and a storage compartment comprising a housing, partitions within said housing dividing the interior into at least three compartments, the first and third compartments having openings normally closed by doors, heating means located within said first compartment in a position to heat the air therein, a second compartment located between said first and third compartments, exhaust fan means, said second compartment having an opening providing communication with the exterior of said housing, air duct means connecting said exhaust fan means with a discharge chamber, means selectively controlling the discharge of air from said chamber, said third compartment providing a storage area, means for driving said fan means, a control panel, and means on said control panel for selectively controlling the operating of said heating means and said means for driving said fan means.

3. A high closet for mounting above the cooking area of a cooking device, said high closet having walls and partition defining multiple compartments and an additional compartment with walls common to said multiple compartments through which heat can pass to influence the temperature in said multiple compartments, said additional compartment having an inlet for air into the bottom of the same directly above said cooking area, a discharge for air in spaced relation to said inlet, blower means mounted in a manner to draw air through said inlet and into contact with the walls of said additional compartment and discharge such air through said discharge after contact with the walls common to said multiple compartments, and means for maintaining a constant elevated temperature in one or more of said multiple compartments.

4. A high closet for a kitchen stove having a cooking top comprising wall structure defining a housing, means for supporting said housing in spaced relation above said cooking top, said housing having an air inlet opening in its bottom and intermediate the sides of the cooking top, partition means within said housing dividing the same into multiple compartments, temperature modification means in one of said compartments, means for producing air flow from said cooking top upwardly beneath said compartments and into said air inlet, removable filter means for said air, and means for discharging the filtered air whereby at least one compartment of said housing will have the temperature of the air therein and the temperature of food exposed to said air modified.

5. The structure of claim 4 in which heat supplying means and means for producing air flow are located within one of said compartments.

References Cited
UNITED STATES PATENTS

| | | |
|---|---|---|
| 2,392,038 | 1/1946 | Gaylord. |
| 3,251,290 | 5/1966 | Jenson et al. _____ 126—299 X |

EDWARD G. FAVORS, Primary Examiner

U.S. Cl. X.R.

98—115